United States Patent
Frame et al.

(10) Patent No.: US 8,719,495 B2
(45) Date of Patent: May 6, 2014

(54) CONCATENATING A FIRST RAID WITH A SECOND RAID

(75) Inventors: Donald R. Frame, Apex, NC (US); Jeffrey R. Hobbet, Holly Springs, NC (US); Kenneth Dean Timmons, Raleigh, NC (US); Michael Scott Mettler, Durham, NC (US)

(73) Assignee: Lenovo (Singapore) PTE. Ltd., Tech Park (SG)

( * ) Notice: Subject to any disclaimer, the term of this patent is extended or adjusted under 35 U.S.C. 154(b) by 188 days.

(21) Appl. No.: 12/750,367

(22) Filed: Mar. 30, 2010

(65) Prior Publication Data

US 2011/0246716 A1  Oct. 6, 2011

(51) Int. Cl.
*G06F 3/00* (2006.01)
*G06F 11/00* (2006.01)
*G06F 3/06* (2006.01)
*G06F 11/10* (2006.01)

(52) U.S. Cl.
CPC .......... *G06F 3/0689* (2013.01); *G06F 11/1076* (2013.01)
USPC ........................................................ 711/114

(58) Field of Classification Search
USPC ........................................................ 711/114
See application file for complete search history.

(56) References Cited

U.S. PATENT DOCUMENTS

| | | | |
|---|---|---|---|
| 5,392,244 A * | 2/1995 | Jacobson et al. | 711/114 |
| 6,898,667 B2 * | 5/2005 | Umberger et al. | 711/114 |
| 7,302,536 B2 * | 11/2007 | Watanabe | 711/162 |
| 7,346,755 B2 * | 3/2008 | Pomaranski et al. | 711/202 |
| 7,389,396 B1 * | 6/2008 | Goel et al. | 711/167 |
| 7,822,939 B1 * | 10/2010 | Veprinsky et al. | 711/170 |
| 2004/0059958 A1 * | 3/2004 | Umberger et al. | 714/5 |
| 2008/0228997 A1 * | 9/2008 | Farhan et al. | 711/103 |
| 2010/0313044 A1 * | 12/2010 | Rajpal et al. | 713/320 |

* cited by examiner

*Primary Examiner* — Matthew Bradley
*Assistant Examiner* — Craig Goldschmidt
(74) *Attorney, Agent, or Firm* — Kunzler Law Group

(57) ABSTRACT

A method and apparatus are disclosed for concatenating a first RAID and a second RAID. The apparatus includes a concatenation module and a direction module. The concatenation module concatenates a first Redundant Array of Independent Disks ("RAID") with a second RAID into a top-level RAID. The first RAID and the second RAID may have disparate operational characteristics. The direction module directs storage operations to one of the first RAID and the second RAID based on a direction policy.

18 Claims, 8 Drawing Sheets

CONCATENATING A FIRST RAID WITH A SECOND RAID

BACKGROUND

1. Field

The subject matter disclosed herein relates to a Redundant Array of Independent Disks ("RAID") and more particularly relates to concatenating a first RAID with a second RAID.

2. Description of the Related Art

A Redundant Array of Independent Disks ("RAID") often includes a plurality of storage devices of a similar type. For example, a RAID may include a plurality of Solid-State Drives ("SSD"s) or a plurality of Hard Disk Drives ("HDD"s). But due to the cost associated with implementing an entire RAID with SSD storage devices, some storage solutions utilize a mixture of storage devices of more than one type.

These mixed-type solutions, however, are often inflexible, not using the full capacity of the SSD storage devices. In addition, a user must often manually manage data between the groups of storage devices.

SUMMARY

From the foregoing discussion, inventors herein have identified a need for a method and apparatus that concatenates a first RAID with a second RAID. Beneficially, such a method, apparatus, and system would concatenate RAIDs having disparate operational characteristics.

The embodiments of the present disclosure have been developed in response to the present state of the art, and in particular, in response to the problems and needs in the art that have not yet been fully solved by currently available RAIDs. Accordingly, the embodiments have been developed to provide a method and apparatus for concatenating a first RAID with a second RAID that overcome many or all of the above-discussed shortcomings in the art.

The apparatus for concatenating a first RAID with a second RAID is provided with a plurality of modules. The modules include a concatenation module and a direction module. The concatenation module concatenates a first Redundant Array of Independent Disks ("RAID") with a second RAID into a top-level RAID. The first RAID and the second RAID have disparate operational characteristics. The direction module directs storage operations to one of the first RAID and the second RAID based on a direction policy.

In a further embodiment, the first RAID includes a Solid-State Drive ("SSD") RAID and the second RAID includes a Hard Disk Drive ("HDD") RAID. In certain embodiments, the top-level RAID includes a single logical address space. In a further embodiment, the concatenation module maintains the first RAID at a lower portion of the single logical address space according to the direction policy. An operating system in communication with the top-level RAID may load operational data beginning at the lower portion of the single logical address space.

In one embodiment, the direction module further includes an abstraction module mapping one or more first addresses from a storage client to one or more second addresses of the top-level RAID according to the direction policy. The one or more first addresses may be associated with a storage operation for the top-level RAID. The top-level RAID may store data of the storage operation at a location on one of the first RAID and the second RAID based on the one or more second addresses. In a further embodiment, the abstraction module maps the one or more first addresses to the one or more second addresses based on one or more characteristics of data associated with the storage operation.

In one embodiment, the apparatus further includes a management module managing data on the first RAID and the second RAID in response to available space on one of the first RAID and the second RAID reaching a threshold. In a further embodiment, the management module further includes a demotion module determining one or more demotion characteristics of data stored on the first RAID. The demotion module moves the data stored on the first RAID from the first RAID to the second RAID in response to determining one or more demotion characteristics of the data on the first RAID.

In one embodiment, the management module includes a promotion module determining one or more promotion characteristics of data stored on the second RAID. The promotion module moves data stored on the second RAID from the second RAID to the first RAID in response to determining one or more promotion characteristics of the data on the second RAID.

A method is presented for concatenating a first RAID with a second RAID. In one embodiment, the method includes the steps to carry out the functions of the apparatus.

A computer program product is also presented for concatenating a first RAID with a second RAID, also with similar steps to carry out the functions of the apparatus.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible storage devices, and/or execute programmed functions. Modules may also include a computer readable storage medium comprising a computer readable program stored on a tangible storage device that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
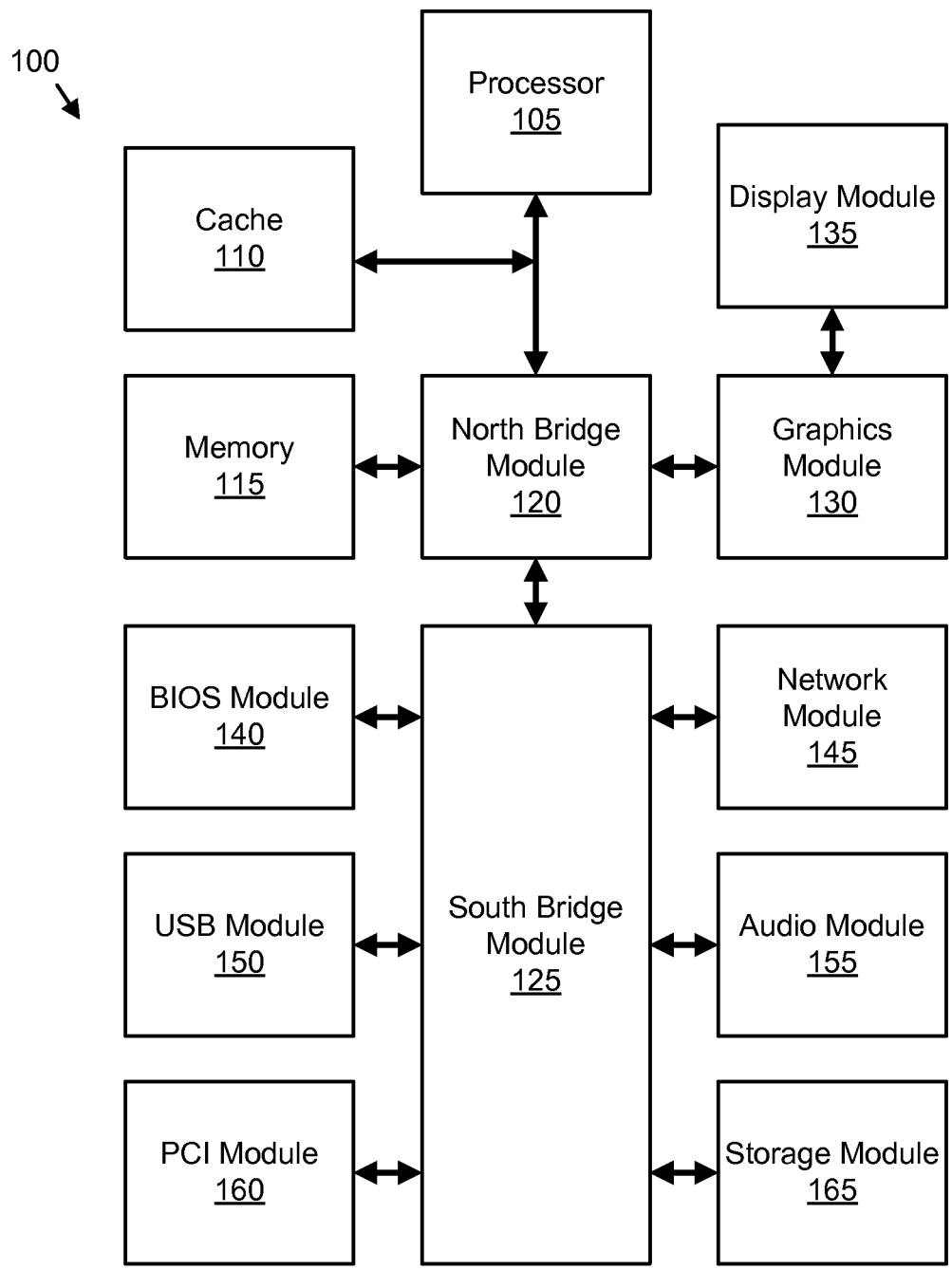
FIG. 1 is a schematic block diagram illustrating one embodiment of a computer system.

FIG. 1 is a schematic block diagram illustrating one embodiment of a computer system 100. The computer system 100 includes a processor 105, a cache 110, a memory 115, a north bridge module 120, a south bridge module 125, a graphics module 130, a display module 135, a basic input/output system (BIOS) module 140, a network module 145, a universal serial bus (USB) module 150, an audio module 155, a peripheral component interconnect (PCI) module 160, and a storage module 165. One of skill in the art will recognize that other configurations of a computer system 100 or multiple computer systems 100 may be employed with the embodiments described herein.

The processor 105, cache 110, memory 115, north bridge module 120, south bridge module 125, graphics module 130, display module 135, BIOS module 140, network module 145, USB module 150, audio module 155, PCI module 160, and storage module 165, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 115 stores computer readable programs. The processor 105 executes the computer readable programs as is well known to those skilled in the art. The computer readable programs may be tangibly stored in the storage module 165. The storage module 165 may comprise at least one SSD. In addition, the storage module 165 may include a hard disk drive, an optical storage device, a holographic storage device, a micromechanical storage device, or the like.

The processor 105 may communicate with the cache 110 through a processor interface bus to reduce the average time to access memory 115. The cache 110 may store copies of instructions and data from the most frequently used memory 115 locations. The computer system 100 may use one or more caches 110 such as a Double Data Rate 2 (DDR2) cache memory or the like.

The north bridge module 120 may communicate with and provide bridging functionality between the processor 105, the graphic module 130, the memory 115, and the cache 110. The processor 105 may be connected to the north bridge module 120 over a, for example, 667 Megahertz (MHz) front side bus.

The north bridge module 120 may be connected to the south bridge module 125 through a direct media interface (DMI) bus. The DMI bus may provide a high-speed, bi-directional, point-to-point link supporting a clock rate for example of one Gigabytes per second (1 GBps) in each direction between the north bridge module 120 and the south bridge module 125. The south bridge module 125 may support and communicate with the BIOS module 140, the network module 145, the PCI module 160, and the storage module 165.

The PCI module 160 may communicate with the south bridge module 125 for transferring data or power to peripheral devices. The PCI module 160 may include a PCI bus for attaching the peripheral devices. The PCI bus can logically connect several peripheral devices over the same set of connections. The peripherals may be selected from a printer, a joystick, a scanner, or the like. The PCI module 160 may also comprise an expansion card as is well known to those skilled in the art.

The BIOS module 140 may communicate instructions through the south bridge module 125 to boot the computer system 100, so that computer readable software instructions stored on the storage module 165 can load, execute, and assume control of the computer system 100. Alternatively, the BIOS module 140 may comprise a coded program embedded on a chipset that recognizes and controls various devices that make up the computer system 100.

The network module 145 may communicate with the south bridge module 125 to allow the computer system 100 to communicate with other devices over a network. The devices may include routers, bridges, computers, printers, and the like.

The display module 135 may communicate with the graphic module 130 to display information as will be described hereafter. The display module 135 may be a cathode ray tube (CRT), a liquid crystal display (LCD) monitor, or the like.

The USB module 150 may communicate with one or more USB compatible devices over a USB bus. The audio module 155 may generate an audio output.

In one embodiment, each module comprises a computer readable storage medium comprising a computer readable program stored on a tangible storage device.

Figure 2:
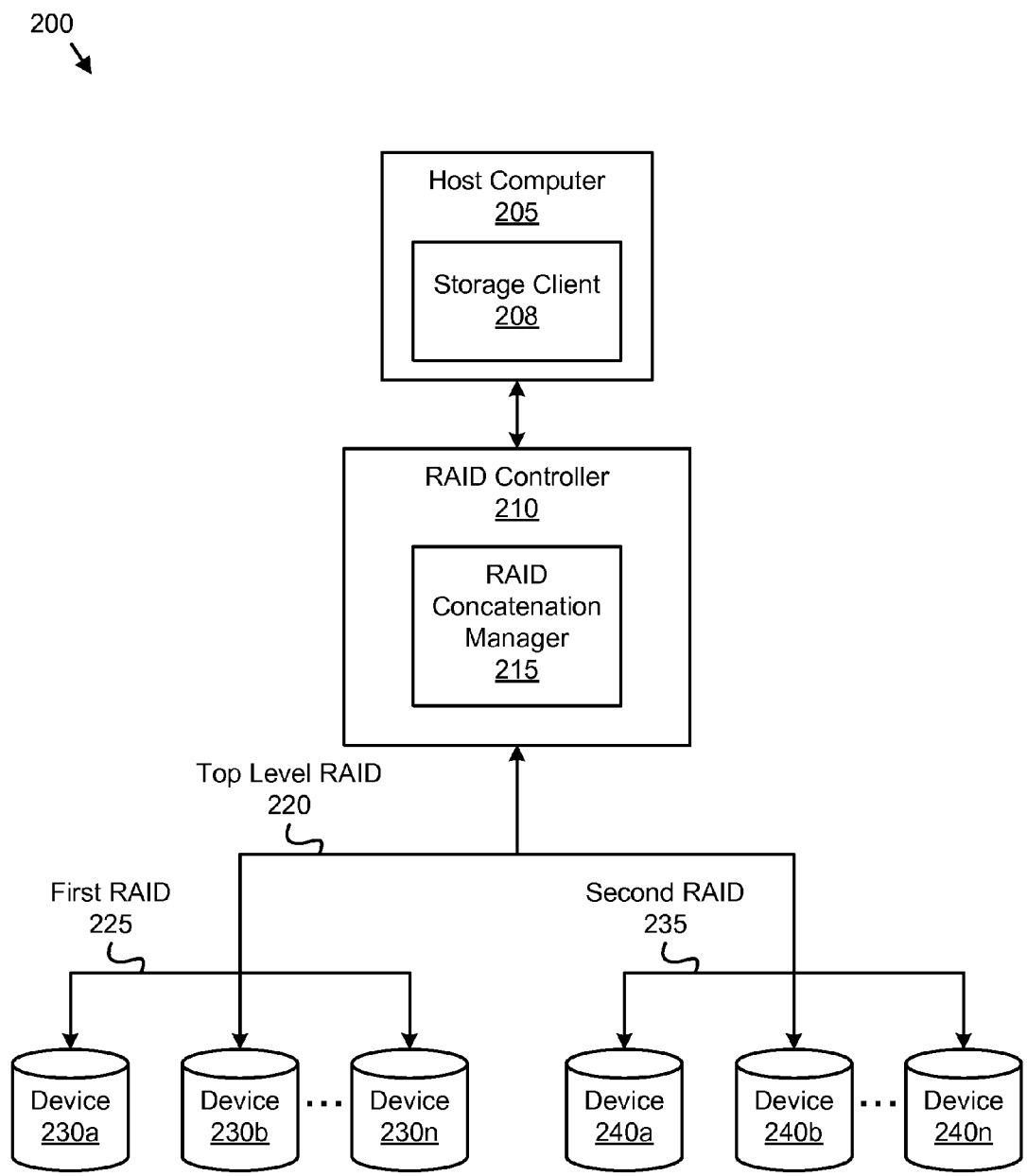
FIG. 2 is a schematic block diagram illustrating one embodiment of a system for concatenating a first RAID with a second RAID.

FIG. 2 is a schematic block diagram illustrating one embodiment of a system 200 for concatenating a first RAID with a second RAID. The system 200 includes a host computer 205 with a storage client 208, a RAID controller 210 with a RAID concatenation manager 215, a top-level RAID 220, and two lower RAIDs: a first RAID 225 of first storage devices 230a-n, and a second RAID 235 of second storage devices 240a-n.

The host computer 205 may include a server, file server, computer, or other computing device and may be similar to the computer system 100 of FIG. 1. The host computer 205 is operationally coupled to the RAID controller 210 through various means such as, but not limited to a bus or cable connection or through a network. One of ordinary skill in the art realizes that multiple host computers 205 may be operationally coupled to the RAID controller 210. The host computer 205 may include a storage client 208 that issues storage operations to storage devices, such as the first storage devices 230a-n and the second storage devices 240a-n, in communication with the host computer 205. As used herein, a storage client 208 is a device, driver, program, application, and/or utility that issues storage operations, issues requests to read stored data, and the like.

Examples of storage clients 208 include, but are not limited to an operating system running on the host computer 205, an application running on the host computer 205, a portion of the operating system that manages storage, and the like. A storage client 208 may be software, hardware or a combination of hardware and software. The storage client 208 may be in communication with the RAID controller 210 to communicate storage operations to the RAID controller 210 for data stored on the top-level RAID 220. The storage client 208 may issue storage operations that include one or more logical block addresses ("LBA"s) associated with data for storage. For example, the storage client 208 may issue a storage operation with an associated LBA range or LBA definition. Although the storage client 208 is depicted as residing in the host computer 205, the storage client 208 may reside outside the host computer 205. In addition, more than one storage client 208 may be in communication with the RAID controller 210.

Although a single RAID controller 210 is depicted, one of ordinary skill in the art realizes that the host computer 205 may be operationally coupled to multiple RAID controllers 210 or to a master RAID controller 210 controlling one or more sub-controllers. The RAID controller 210 may be implemented in hardware, software, or a combination of hardware and software. The RAID controller 210 manages a plurality of storage devices 230a-n, 240a-n in a RAID configuration. In the depicted embodiment, the RAID controller 210 maintains a top-level RAID 220 with two lower RAIDs: a first RAID 225 and a second RAID 235.

The first RAID 225 includes an array of first storage devices 230a-n and the second RAID 235 includes an array of second storage devices 240a-n. Although FIG. 2 shows two lower RAIDs 225,235, the top-level RAID 220, in certain embodiments, may include an array of more than two lower RAIDs.

Furthermore, the first RAID 225 and the second RAID 235 may have disparate, different and/or varying operational characteristics. Operational characteristics may include operational characteristics of the RAID 225,235 as a whole and/or individual storage devices 230a-n,240a-n in the RAID 225,235. Furthermore, operational characteristics may include, but are not limited to, performance characteristics, physical characteristics, and the like. For example, performance characteristics may include time and resource requirements during initialization or set-up procedures, when storing and retrieving data, when performing maintenance operations, during data backup operations, and the like. Performance characteristics may also include data integrity issues including error rates, data longevity, and the like. Physical characteristics may include cost of storage, heat generation, noise, power consumption, manufacturer, and the like. Operational characteristics may depend at least in part on and/or be inherent in the type of storage device 230a-n, 240a-n in the RAID 225,235.

Figure 3:
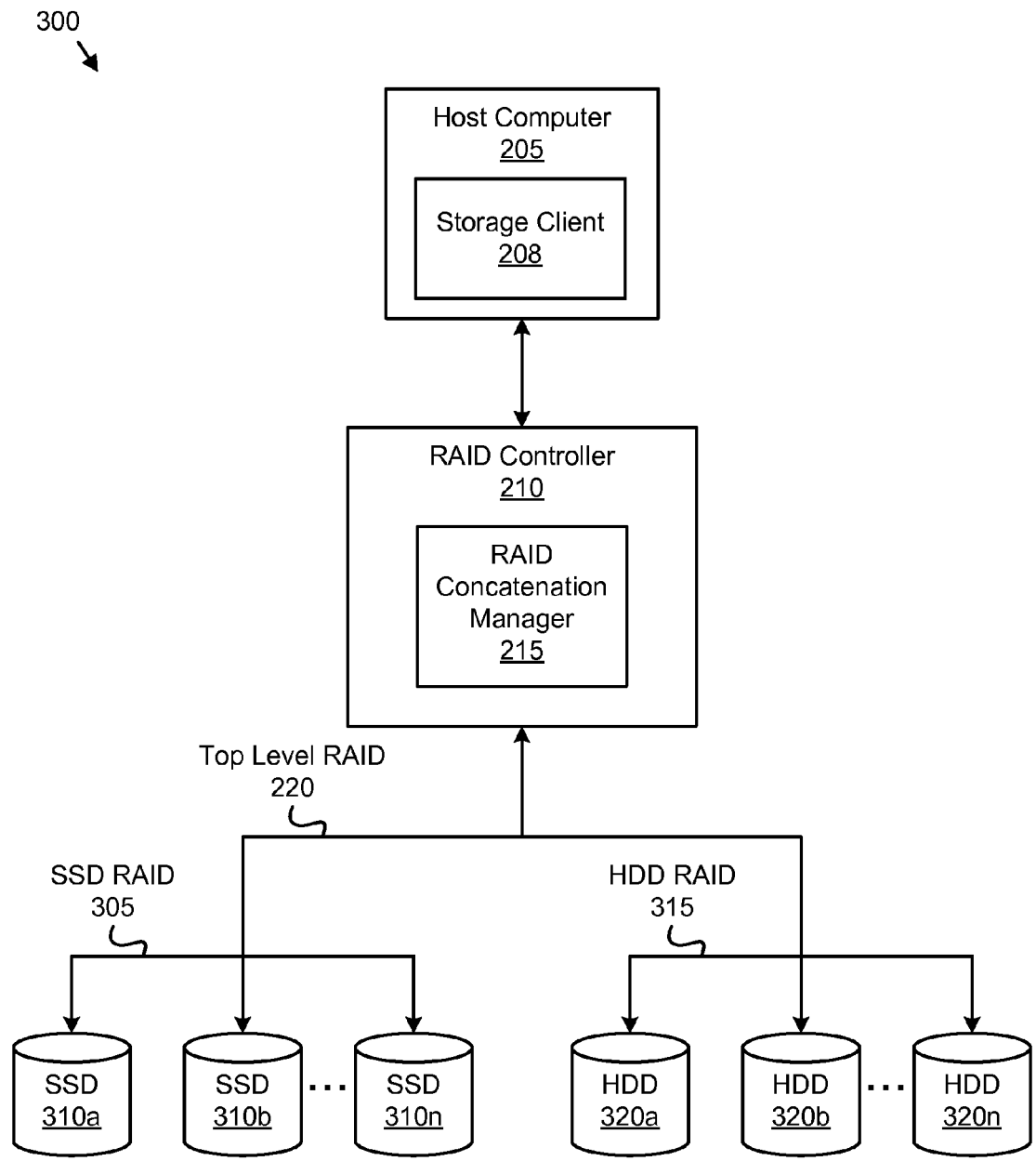
FIG. 3 is a schematic block diagram illustrating another embodiment of a system for concatenating a first RAID with a second RAID.

In certain embodiments, the first storage devices 230a-n (of the first RAID 225) are of a different type than the second storage devices 240a-n (of the second RAID 235). Referring to FIG. 3, in one embodiment, the first RAID 305 includes Solid-State Drive ("SSD") storage devices 310a-n while the second RAID 315 includes Hard Disk Drive ("HDD") storage devices 320a-n. The system 300 of FIG. 3 also includes a host computer 205 with a storage client 208, a RAID controller 210 with a RAID concatenation manager 215, wherein these are similar to the like numbered components in FIG. 2.

As is known by one of ordinary skill in the art, SSD storage devices 310a-n have different operational characteristics than HDD storage devices 320a-n. Specifically, a SSD storage device 310a may achieve better performance at random data transfers and small block transfers and may be faster at overall I/O than an HDD storage device 320a. Furthermore, an SSD storage device 310a consumes less power than an HDD storage device 320a. An HDD storage device 320a may be achieve better performance at sequential operations than an SSD storage device 310a and may have a much bigger storage capacity than an SSD storage device 310a of similar cost. Although FIG. 3 shows a top-level RAID 220 with an SSD RAID 305 and an HDD RAID 315, the top-level RAID 220 may include combinations of two or more lower RAIDs 305, 315 of various other types of storage devices 310a-n,320a-n. For example, the top-level RAID 220 may include a first RAID 305 of HDD devices and a second RAID 315 of tape devices.

Referring back to FIG. 2, the RAID controller 210 includes a RAID concatenation manager 215. As depicted in FIG. 2, the RAID concatenation manager 215 may reside on the RAID controller 210. For example, the RAID concatenation manager 215 may reside on firmware or hardware of the RAID controller 210. In another embodiment, the RAID concatenation manager 215 resides outside the RAID controller 210 (such as on the host computer 205) and may be in communication with the RAID controller 210 regarding the underlying physical structure of the top level RAID 220 and/or the first RAID 225 and the second RAID 235. In one embodiment, a portion of the RAID concatenation manager 215 resides on the RAID controller 210 and a portion resides on the host computer 205, server, or other computing device in communication with the RAID controller 205.

The RAID concatenation manager 215 enables the top-level RAID 220 to accommodate the operational characteristics of each lower RAID 225,235 to achieve enhanced performance. The RAID concatenation manager 215 may direct storage operations to the first RAID 225 and/or the second RAID 235 based on characteristics of the files/data to be stored and/or data loading patterns of the storage client 208. Specifically, the RAID concatenation manager 215 may actively direct a storage operation to the first RAID 225 or the second RAID 235 based on characteristics of a file and/or data of the storage operation. Furthermore, the RAID concatenation manager 215 may maintain the top-level RAID 220 as a single logical address space.

The RAID concatenation manager 215 may maintain the first RAID 225 and/or second RAID 235 in a position in the single address space to complement data/code loading patterns of operating systems, storage clients 208, and other programs and/or hardware. The RAID concatenation manager 215 may also dynamically alter the data stored on the first RAID 225 and/or the second RAID 235 to improve overall performance of the top-level RAID 220.

The RAID concatenation manager 215 may manage the top-level RAID 220 according to a direction policy. A direction policy may specify how the RAID concatenation manager 215 maintains the lower RAIDs 225,235, how the RAID concatenation manager 215 directs storage operations to the lower RAIDs 225,235, the addresses in the single address space that correspond to each lower RAID 225, 235, and the like. The direction policy may be pre-determined, such as by a storage device manufacturer, and/or may be user-configured. The direction policy may also be determined by the RAID concatenation manager 215 based on the types of storage devices 230a-n,240a-n in the lower RAIDs 225,235, the type of operating system in the host computer 205, and the like.

Figure 4:
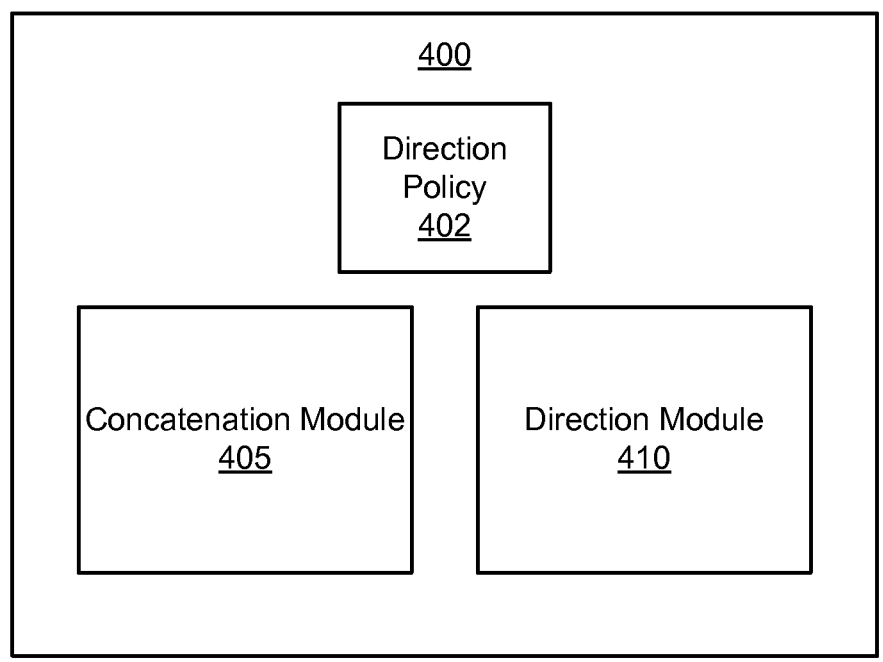
FIG. 4 is a schematic block diagram illustrating one embodiment of an apparatus for concatenating a first RAID with a second RAID.

FIG. 4 is a schematic block diagram illustrating one embodiment of an apparatus 400 for concatenating a first RAID 225 with a second RAID 235. The apparatus 400 may be the RAID concatenation manager 215 depicted in FIG. 2 and/or in FIG. 3. The description of the apparatus 400 refers to elements of FIGS. 1-3, like numbers referring to like elements. The apparatus 400 includes a direction policy 402, a concatenation module 405 and a direction module 410.

The direction policy 402, may referenced and/or accessed by the concatenation module 405 and the direction module 410. The direction policy 402 may include configuration information for the concatenation module 405 and the direction module 410. The direction policy 402 may be implemented by hardware logic and/or executable code stored on one or more computer readable storage media. As stated above, the direction policy 402 may be predetermined and/or user configurable. Although the direction policy 402 is depicted in FIG. 4 as a separate entity, portions of the direction policy 402 may reside or be incorporated into one or more modules in the apparatus 400.

The concatenation module 405 concatenates two or more lower RAIDs 225,235. Specifically, the concatenation module 405 may concatenate a first RAID 225 with a second RAID 235 into a top-level RAID 220. In one embodiment, the concatenation module 405 concatenates two or more lower RAIDs 225,235 by representing them as a virtual volume. In one embodiment, the concatenation module 405 represents the top-level RAID 220 as a single logical address space such as a single logical block address ("LBA") range. In another embodiment, the concatenation module 405 represents the top-level RAID 220 such that the top-level RAID 220 appears as a single drive letter in certain operating systems.

The first RAID 225 and the second RAID 235 concatenated by the concatenation module 405 may have disparate operational characteristics and/or may include different types of storage devices 230a-n,240a-n. The operational characteristics may be inherent in each of the first RAID 225 and the second RAID 235 as a whole, and/or in the storage devices 230a-n,240a-n included in each lower RAID 225,235. In one embodiment, the first RAID 225 is an SSD RAID 305 and the second RAID 235 is an HDD RAID 315 (see FIG. 3). In one embodiment, the first RAID 225 is an SSD RAID 305 and the second RAID 235 is a non-SSD RAID, or a RAID including storage devices that are not SSD storage devices.

In certain embodiments, the concatenation module 405 concatenates and/or maintains the lower RAIDs 225,235 according to the direction policy 402. The direction policy 402 may specify addresses in the logical address space that correspond to each lower RAID 225,235. In one embodiment, the concatenation module 405 maintains the first RAID 225 at a lower portion of the single logical address space according to the direction policy 402. The position in the logical address space of a certain lower RAID 225,235 may complement operational data loading patterns of operating systems, storage clients 208, and other programs and/or hardware. As used herein, operational data may include data, code, and/or files. Examples of operational data include but are not limited to dynamic-link library ("DLL") files, executable ("EXE") files, and the like.

For example, an operating system in communication with the top-level RAID 220, during operating system installation, may load operational data beginning at the lower portion of the single logical address space. In one embodiment, the first RAID 225, maintained at the lower portion, is an SSD RAID 305. As a result, the files and operational data of the operating system would be loaded onto the SSD RAID 305, which may provide improved performance when accessing the operational data.

The direction module 410 directs storage operations to one of the first RAID 225 and the second RAID 235 based on the direction policy 402. The direction module 410 may track the boundaries between the first RAID 225 and the second RAID 235. Therefore, in one embodiment, directing a storage operation includes storing, facilitating storage, and/or directing the storage of data for the storage operation to the first RAID 225 if logical addresses from the storage client 208 for the storage operation lie in the boundary for the first RAID 225, or the second RAID 235 if logical addresses from the storage client 208 for the storage operation lie in the boundary for the second RAID 235. For example, the direction policy 402 may specify that the LBAs of the storage client 208 directly correspond with the LBAs in the logical address space of the top-level RAID 220 and that the direction module 410 directs storage operations to the LBAs specified by the storage client 208.

However, in certain embodiments, the direction module 410 may actively direct storage operations to a particular lower RAID 225,235. Specifically, in one embodiment, the direction module 410 provides an abstraction layer between the addresses associated with a storage operation (e.g. LBAs specified by the storage client 208) and the actual addresses that correspond to physical locations on the lower RAIDs 225,235. For example, the direction module 410 may map between LBAs from the storage client 208 and LBAs of the top-level RAID address space. Therefore, the LBA range (and physical location) which a storage client 208 specifies may not be the LBA range (and physical location) the data is eventually stored by the top-level RAID 220.

In one embodiment, the direction module 410 may direct storage operations to a particular lower RAID 225 until available space on the particular lower RAID 225 reaches a threshold. At that point, the direction module 410 may begin directing storage operations to both lower RAIDs 225,235. For example, the direction module 410 may direct storage operations to the first RAID 225 until available space on the first RAID 225 reaches a threshold. Then, the direction module 410 may direct storage operations to either the first RAID 225 or the second RAID 235.

Figure 5:
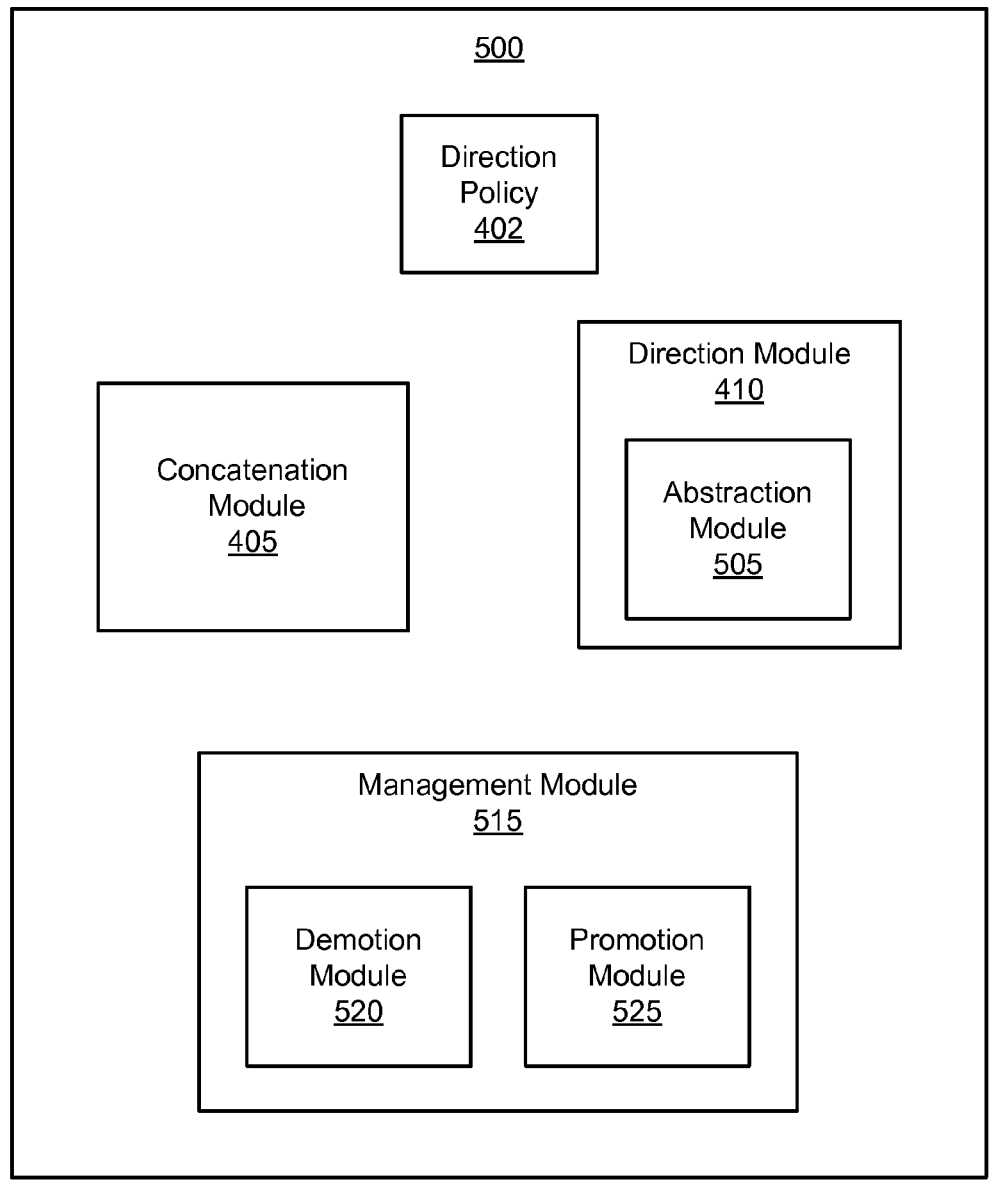
FIG. 5 is a detailed schematic block diagram illustrating another embodiment of an apparatus for concatenating a first RAID with a second RAID.

FIG. 5 is a detailed schematic block diagram illustrating another embodiment of an apparatus for concatenating a first RAID 225 with a second RAID 235. The apparatus 500 may be the RAID concatenation manager 215 depicted in FIG. 2 or in FIG. 3. The description of the apparatus 500 refers to elements of FIGS. 1-4 like numbers referring to like elements. The apparatus 500 includes the direction policy 402, the concatenation module 405 and the direction module 410 wherein these include substantially the same features as described in relation to FIG. 4. In addition, the direction module 410 includes an abstraction module 505 and the apparatus 500 includes a management module 515 with a demotion module 520 and a promotion module 525.

The abstraction module 505 maps one or more first addresses from a storage client 208 to one or more second addresses of the top-level RAID 220 according to the direction policy 402. The abstraction module 505 may provide an abstraction layer between first addresses, or addresses associated with a storage operation (e.g. LBAs specified by the storage client 208) directed to the top-level RAID 220 and second addresses, or the addresses maintained for the top-level RAID 220 that correspond to physical locations on the lower RAIDs 225,235. For example, the abstraction module 505 may map between LBAs from the storage client 208 and LBAs of the address space for the top-level RAID 220. Furthermore, the top-level RAID 220 may store data of a storage operation at a location on the first RAID 225 or the second RAID 235 based on the one or more second addresses, or addresses that correspond to physical locations on the first RAID 225 or the second RAID 235. Therefore, the LBA range (and physical location) which a storage client 208 specifies may not be the LBA range (and physical location) at which the top-level RAID 220 data actually stores the data.

In one embodiment, the abstraction module 505 maintains the mapping of addresses from the storage client 208 to addresses of the top-level RAID 220 in a map or index. The map/index may be in the form of a tree, a hash table, and/or other data structure.

In one embodiment, the abstraction module 505 maps the first addresses (from the storage client 208) to the second addresses (of the top-level RAID 220) based on one or more characteristics of a file and/or data associated with a storage operation from the storage client 208. The abstraction module 505 may also determine which lower RAID 225,235 to store data associated with a storage operation based on the characteristics of the file and/or data of the storage operation along with the operational characteristics of each lower RAID 225, 235. For example, if the second RAID 235 is a HDD RAID 315 and the storage client 208 issues a storage operation to store a file of several gigabytes, the abstraction module 505 may map the addresses associated with the storage operation to available addresses on the second RAID 235 and the abstraction module 505 may store, or facilitate the storing, of the file on the second RAID 235 as the HDD storage devices of the second RAID 235 may have a bigger storage capacity than the SSD storage devices of the first RAID 225.

The abstraction module 505 may determine one or more characteristics of a file and/or data of a storage operation and map the first addresses of the file/data based on the determined characteristics. These characteristics may include but are not limited to file/data size, file type, and the like. In one embodiment, the direction policy 402 specifies mapping definitions according to characteristics of the file/data and the operational characteristics of the lower RAIDs 225,235. For example, the direction policy 402 may specify that if a file of a storage operation is a DLL file and the first RAID 225 is an SSD RAID 305, the abstraction module 505 should map the file to the first RAID 225.

The management module 515 manages files and/or data on the first RAID 225 and the second RAID 235. In one embodiment, the management module 515 manages files/data by dynamically altering the files/data stored on each lower RAID 225,235. For example, the management module 515 may move data stored on the first RAID 225 to the second RAID 235 or move data stored on the second RAID 235 to the first RAID 225. In certain embodiments, the management module 515 manages files/data on the first RAID 225 and the second RAID 235 in response to the first RAID and/or the second RAID 235 satisfying a management condition. The management condition may include whether available space on the first RAID 225 reaches a threshold level, whether performance of the first RAID 225 drops to a threshold level, and the like. For example, the management module 515 may begin managing files/data on the first RAID 225 and the second RAID 235 in response to determining that available space on either the first RAID 225 or the second RAID 235 reaches a threshold.

As described above, the direction module 410 may direct storage operations to a particular lower RAID 225 until available space on the particular lower RAID 225 reaches a threshold. The management module 515 may then manage files/data on both lower RAIDs 225,235. For example, if the direction module 410 directs storage operations to the first RAID 225 and available space on the first RAID 225 reaches 10%, the management module 515 may move files/data from the first RAID 225 to the second RAID 235. The direction module 410 may also then direct storage operations to both lower RAIDs 225,235.

In one embodiment, the management module 515 includes a demotion module 520 to move data from the first RAID 225 to the second RAID 235 and a promotion module 525 to move data from the second RAID 235 to the first RAID 225. The demotion module 520 determines one or more demotion characteristics of data stored on the first RAID 225. Demotion characteristics are characteristics and/or indicia that, when present or when present in addition to meeting a threshold, indicate that data may be moved from the first RAID 225 to the second RAID 235. Demotion characteristics may be based on characteristics of the file or data itself such as file type or size. Demotion characteristics may also based on the frequency of file access requests, the amount of time it takes to access a given file, and the like.

The demotion module 520 moves the data stored on the first RAID 225 from the first RAID 225 to the second RAID 235 in response to determining one or more demotion characteristics of the data on the first RAID 225. For example, if the first RAID 225 is an SSD RAID 305 and the second RAID 235 is an HDD RAID 315 and the first RAID 225 stores a file that the storage client 208 rarely accesses, the demotion module 520 may move the file to the second RAID 235 in response to determining that the file is accessed below an access threshold in accordance with a demotion characteristic. Furthermore, if the first RAID 225 is an SSD RAID 305 and the second RAID 235 is an HDD RAID 315 and the first RAID 225 stores a file that is several gigabytes in size, the demotion module 520 may move the file to the second RAID 235 in response to determining that the file size exceeds a size threshold in accordance with a demotion characteristic.

The promotion module 525 determines one or more promotion characteristics of data stored on the second RAID 235. Promotion characteristics are characteristics and/or indicia that, when present or when present in addition to meeting a threshold, indicate that data may be moved from the second RAID 235 to the first RAID 225. Promotion characteristics may be based on characteristics of the file/data itself such as file type or size. Promotion characteristics may also based on the frequency of file access requests, the amount of time it takes to access a given file, and the like. The promotion module 525 moves data stored on the second RAID 235 from the second RAID 235 to the first RAID 225 in response to determining one or more promotion characteristics of the data. For example, if the first RAID 225 is an SSD RAID 305 and the second RAID 235 is an HDD RAID 315 and the second RAID 235 stores a file that the storage client 208 accesses frequently, the promotion module 525 may move the file to the first RAID 225 in response to determining that the file is accessed above an access threshold in accordance with a promotion characteristic.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
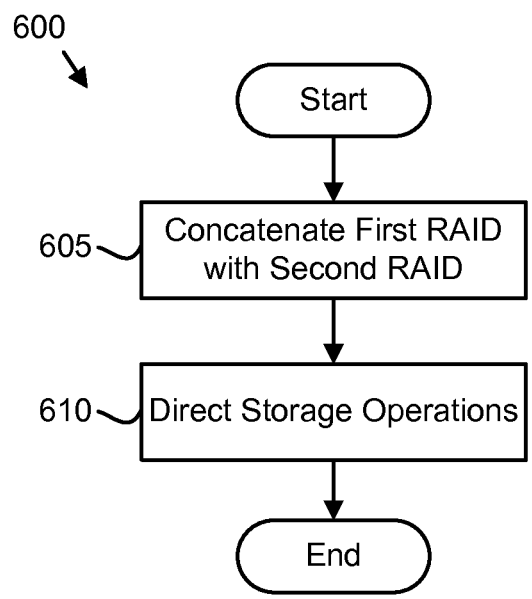
FIG. 6 is a schematic flow chart diagram illustrating one embodiment of a method for concatenating a first RAID with a second RAID.

FIG. 6 is a schematic flow chart diagram illustrating one embodiment of a method 600 for concatenating a first RAID 225 with a second RAID 235. The method 600 substantially includes the steps to carry out the functions presented above with respect to the operation of the described apparatus and system of FIGS. 1, 2 and 4. The description of the method 600 refers to elements of FIGS. 1, 2 and 4, like numbers referring to like elements.

In one embodiment, the method 600 is implemented with a computer readable storage medium comprising a computer readable program stored on a tangible memory device. The computer readable storage medium may be integrated into a computer system, such as the computer system 100, wherein the computer readable program executed by the processor 105 performs the method 600.

The method 600 starts and the concatenation module 405 concatenates 605 a first RAID 225 with a second RAID 235 into a top-level RAID 220. The first RAID 225 and the second RAID 235 may have disparate operational characteristics. In one embodiment, the first RAID 225 is an SSD RAID 305 and the second RAID 235 is an HDD RAID 315. The top-level RAID 220 may comprise a single logical address space. Next, the direction module 410 directs 610 storage operations to the first RAID 225 or the second RAID 235 based on a direction policy 402. In one embodiment, the direction module 410 may direct a storage operation to the first RAID 225 if logical addresses from the storage client 208 lie in the boundary of the single address space corresponding to the first RAID 225, or the second RAID 235 if logical addresses from the storage client 208 lie in the boundary of the single address space corresponding to the second RAID 235. The direction module 410 may also actively direct storage operations based on characteristics of the data or file associated with the storage operation. Then, the method 600 ends.

Figure 7:
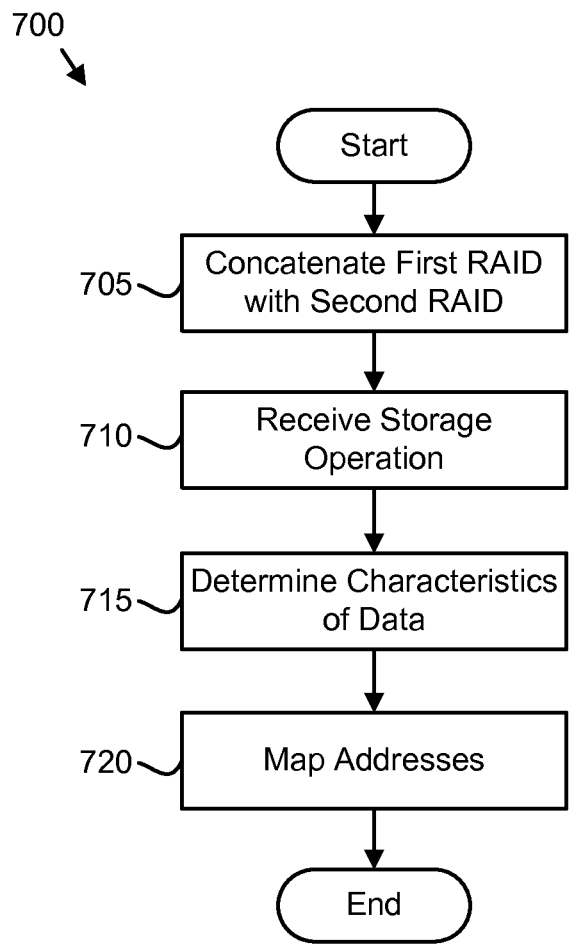
FIG. 7 is a detailed schematic flow chart diagram illustrating another embodiment of a method for concatenating a first RAID with a second RAID.

FIG. 7 is a detailed schematic flow chart diagram illustrating another embodiment of a method 700 for concatenating a first RAID 225 with a second RAID 235. The method 700 substantially includes the steps to carry out the functions presented above with respect to the operation of the described apparatus and system of FIGS. 1, 2, 4 and 5. The description of the method 700 refers to elements of FIGS. 1, 2, 4 and 5, like numbers referring to like elements.

In one embodiment, the method 700 is implemented with a computer readable storage medium comprising a computer readable program stored on a tangible memory device. The computer readable storage medium may be integrated into a computer system, such as the computing system 100, wherein the computer readable program executed by the processor 105 performs the method 700.

The method 700 starts and the concatenation module 405 concatenates 705 a first RAID 225 with a second RAID 235 into a top-level RAID 220. The first RAID 225 and the second RAID 235 may have disparate operational characteristics. In one embodiment, the first RAID 225 is an SSD RAID 305 and the second RAID 235 is an HDD RAID 315. The top-level RAID 220 may comprise a single logical address space. Next, the direction module 410 receives 710 a storage operation from the storage client 208 in communication with the top-level RAID 220. The direction module 410 determines 715 one or more characteristics of data associated with the storage operation. The characteristics may include a file size, a file type, and the like.

The abstraction module 505 then maps 720 first addresses from a storage client 208 to second addresses of the top-level RAID 220 according to the direction policy 402 and the determined characteristics of the file/data. In one embodiment, the abstraction module 505 maps LBAs from the storage client 208 (first addresses) to LBAs in the single address space of the top-level RAID 220 (second addresses). Mapping first addresses to second addresses may include assigning a second address range (for the top-level RAID 220) to a first address range (for the storage client 208). In one embodiment, the abstraction module 505 maps the first addresses to the second addresses based on one or more characteristics of a file/data associated with the storage operation. Then, the method 700 ends. The top-level RAID 220 may store data of the storage operation at a location on the first RAID 225 or the second RAID 235 based on the second addresses.

Figure 8:
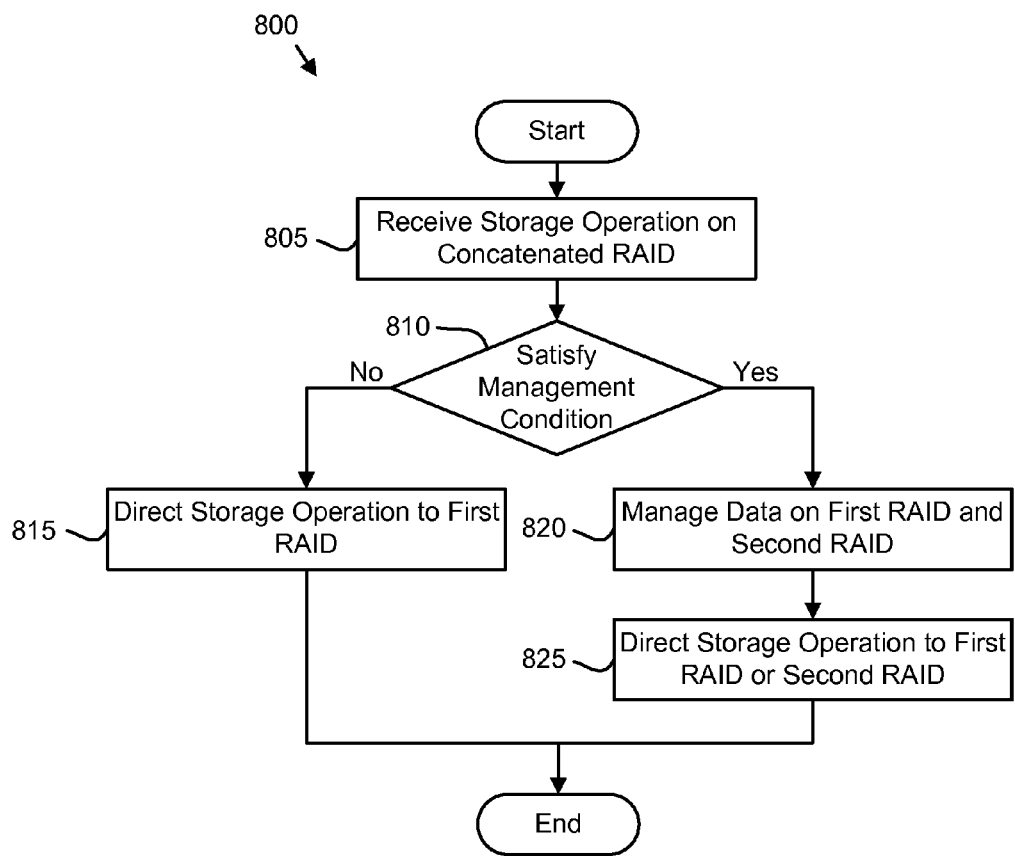
FIG. 8 is a detailed schematic flow chart diagram illustrating one embodiment of a method for data management on a concatenated RAID.

FIG. 8 is a method 800 for data management on a concatenated RAID. The method 800 substantially includes steps to carry out the some functions presented above with respect to the operation of the described apparatus and system of FIGS. 1, 2, 4 and 5. The description of the method 800 refers to elements of FIGS. 1, 2, 4 and 5, like numbers referring to like elements.

In one embodiment, the method 800 is implemented with a computer readable storage medium comprising a computer readable program stored on a tangible memory device. The computer readable storage medium may be integrated into a computer system, such as the computing system 100, wherein the computer readable program executed by the processor 105 performs the method 800.

The method 800 starts and a concatenated RAID (e.g. a top-level RAID 220 with a concatenated first RAID 225 and second RAID 235) receives 805 a storage operation from a storage client 208. The first RAID 225 may be an SSD RAID 305 and the second RAID 235 may be an HDD RAID 315. Next, the direction module 410 determines 810 whether the first RAID 225 satisfies a management condition. The management condition may include whether available space on the first RAID 225 reaches a threshold level, whether performance of the first RAID 225 drops to a threshold level, and the like.

Specifically, in one condition, the direction module 410 determines 810 that the first RAID 225 fails to satisfy the management condition and the direction module 410 directs 815 the storage operation to the first RAID 225 and the method 800 ends.

In the alternate condition, the direction module 410 determines 810 that the first RAID 225 satisfies the management condition. The management module 515 then manages 820 data on the first RAID 225 and the second RAID 235. Managing data may include the demotion module 520 determining demotion characteristics of data stored on the first RAID 225 and moving the data stored on the first RAID 225 from the first RAID 225 to the second RAID 235. Managing data may also include the promotion module 525 may determining promotion characteristics of data stored on the second RAID 235 and moving data stored on the second RAID 235 from the second RAID 235 to the first RAID 225. The direction module 410 may then direct 825 the storage operation to the first RAID 225 or the second RAID 235 and the method 800 ends. The steps of managing 820 and directing 825 to the first RAID 225 or the second RAID 235 may be performed in any order, including simultaneously.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a concatenation module concatenating a first Redundant Array of Independent Disks ("RAID") with a second RAID into a top-level RAID with a single logical block address space range with first RAID addresses at a lower numbered portion of the single logical block address space range relative to second RAID addresses, the first RAID and the second RAID having disparate operational characteristics; and
   a redirection module in which storage operations issued from a storage client to the first RAID are redirected to the second raid according to a redirection policy when the first RAID satisfies a management condition;
   wherein the management condition comprises both available space on the first RAID reaching a space threshold and a drop in first RAID performance below a threshold level;
   wherein the redirection policy comprises the following:
      storage operations for dynamic-link library files, executable files, operating system files and operating system data from the storage client that are directed to the first RAID are not redirected to the second RAID;
      all other storage operations that are directed to the first RAID are redirected to the second RAID.

2. The apparatus of claim 1, wherein the first RAID comprises a Solid-State Drive ("SSD") RAID having SSD storage devices and the second RAID comprises a Hard Disk Drive ("HDD") RAID having HDD storage devices.

3. The apparatus of claim 1, wherein an operating system in communication with the top-level RAID loads operational data beginning at a lower portion of the single logical block address space range relative to the second RAID addresses.

4. The apparatus of claim 1, wherein the redirection module further comprises an abstraction module mapping one or more first addresses from the storage client to one or more second addresses of the top-level RAID according to the redirection policy, the one or more first addresses associated with a storage operation for the top-level RAID, the top-level RAID storing data of the storage operation at a location on one of the first RAID and the second RAID based on the one or more second addresses.

5. The apparatus of claim 4, wherein the abstraction module maps the one or more first addresses to the one or more second addresses based on one or more characteristics of data associated with the storage operation.

6. The apparatus of claim 1, further comprising:
   a management module managing data on the first RAID and the second RAID in response to available space on one of the first RAID and the second RAID reaching a threshold.

7. The apparatus of claim 6, wherein the management module further comprises:
   a demotion module determining one or more demotion characteristics of data stored on the first RAID, the demotion module moving the data stored on the first RAID from the first RAID to the second RAID in response to determining one or more demotion characteristics of the data on the first RAID; and
   a promotion module determining one or more promotion characteristics of data stored on the second RAID, the promotion module moving data stored on the second RAID from the second RAID to the first RAID in response to determining one or more promotion characteristics of the data on the second RAID.

8. A method comprising:
   concatenating a first Redundant Array of Independent Disks ("RAID") with a second RAID into a top-level RAID with a single logical block address space range with first RAID addresses at a lower numbered portion of the single logical block address space range relative to second RAID addresses, the first RAID and the second RAID having disparate operational characteristics; and
   redirecting storage operations, wherein storage operations issued from a storage client to the first RAID are redirected to the second raid according to a redirection policy when the first RAID satisfies a management condition;
   wherein the management condition comprises both available space on the first RAID reaching a space threshold and a drop in first RAID performance below a threshold level;
   wherein the redirection policy comprises the following:
      storage operations for dynamic-link library files, executable files, operating system files and operating system data from the storage client that are directed to the first RAID are not redirected to the second RAID;
      all other storage operations that are directed to the first RAID are redirected to the second RAID.

9. The method of claim 8, wherein the first RAID comprises a Solid-State Drive ("SSD") RAID and the second RAID comprises a Hard Disk Drive ("HDD") RAID.

10. The method of claim 8, wherein an operating system in communication with the top-level RAID loads operational data beginning at a lower portion of the single logical block address space range relative to the second RAID addresses.

11. The method of claim 8, wherein redirecting storage operations further comprises mapping one or more first addresses from the storage client to one or more second addresses of the top-level RAID according to the redirection policy, the one or more first addresses associated with a storage operation for the top-level RAID, the top-level RAID storing data of the storage operation at a location on one of the first RAID and the second RAID based on the one or more second addresses.

12. The method of claim 11, further comprising mapping the one or more first addresses to the one or more second addresses based on one or more characteristics of data associated with the storage operation.

13. The method of claim 8, further comprising:
  managing data on the first RAID and the second RAID in response to available space on one of the first RAID and the second RAID reaching a threshold.

14. The method of claim 13, wherein managing data comprises:
  determining one or more demotion characteristics of data stored on the first RAID;
  moving the data stored on the first RAID from the first RAID to the second RAID in response to determining one or more demotion characteristics of the data on the first RAID;
  determining one or more promotion characteristics of data stored on the second RAID; and
  moving the data stored on the second RAID from the second RAID to the first RAID in response to determining one or more promotion characteristics of the data on the second RAID.

15. A computer program product comprising a "non-transitory" computer readable storage medium storing computer usable program code executable to perform operations comprising:
  concatenating a first Redundant Array of Independent Disks ("RAID") with a second RAID into a top-level RAID with a single logical block address space range with first RAID addresses at a lower numbered portion of the single logical block address space range relative to second RAID addresses, the first RAID and the second RAID having disparate operational characteristics; and
  redirecting storage operations, wherein storage operations issued from a storage client to the first RAID are redirected to the second raid according to a redirection policy when the first RAID satisfies a management condition;
  wherein the management condition comprises both available space on the first RAID reaching a space threshold and a drop in first RAID performance below a threshold level;
  wherein the redirection policy comprises the following:
    storage operations for dynamic-link library files, executable files, operating system files and operating system data from the storage client that are directed to the first RAID are not redirected to the second RAID;
    all other storage operations that are directed to the first RAID are redirected to the second RAID.

16. The computer program product of claim 15, wherein concatenating the first RAID with the second RAID into the top-level RAID further comprises maintaining the first RAID at a lower portion of the single logical address space relative to an address space range of the second RAID according to a direction policy, wherein an operating system in communication with the top-level RAID loads operational data beginning at the lower portion of the single logical address space.

17. The computer program product of claim 15, wherein redirecting storage operations further comprises mapping one or more first addresses from the storage client to one or more second addresses of the top-level RAID according to the redirection policy, the one or more first addresses associated with a storage operation for the top-level RAID, the top-level RAID storing data of the storage operation at a location on one of the first RAID and the second RAID based on the one or more second addresses.

18. The computer program product of claim 15, further comprising:
  managing data on the first RAID and the second RAID in response to the available space on one of the first RAID and the second RAID reaching a threshold, wherein managing data comprises,
  determining one or more demotion characteristics of data stored on the first RAID;
  moving the data stored on the first RAID from the first RAID to the second RAID in response to determining one or more demotion characteristics of the data on the first RAID;
  determining one or more promotion characteristics of data stored on the second RAID; and
  moving the data stored on the second RAID from the second RAID to the first RAID in response to determining one or more promotion characteristics of the data on the second RAID.

* * * * *